United States Patent
Finnigan et al.

(10) Patent No.: US 8,123,488 B2
(45) Date of Patent: Feb. 28, 2012

(54) SYSTEM AND METHOD FOR JOINING TURBINE BLADES

(75) Inventors: Peter Michael Finnigan, Clifton Park, NY (US); Christophe Lanaud, Delanson, NY (US); Govindarajan Rengarajan, Cohoes, NY (US); Gang Qian, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1460 days.

(21) Appl. No.: 11/856,181

(22) Filed: Sep. 17, 2007

(65) Prior Publication Data
US 2009/0136355 A1    May 28, 2009

(51) Int. Cl.
*F03D 1/06* (2006.01)
(52) U.S. Cl. .......... 416/226; 416/238
(58) Field of Classification Search .......... 416/196 R, 416/226, 238
See application file for complete search history.

(56) References Cited

U.S. PATENT DOCUMENTS

| | | | |
|---|---|---|---|
| 4,260,332 A * | 4/1981 | Weingart et al. | 416/226 |
| 4,474,536 A | 10/1984 | Gougeon et al. | |
| 6,976,829 B2 * | 12/2005 | Kovalsky et al. | 416/226 |
| 7,153,090 B2 | 12/2006 | DeLeonardo et al. | |
| 7,654,799 B2 * | 2/2010 | Eyb | 416/229 R |
| 7,976,275 B2 * | 7/2011 | Miebach et al. | 416/61 |
| 2006/0188378 A1 * | 8/2006 | Bech et al. | 416/227 R |

\* cited by examiner

*Primary Examiner* — Nathaniel Wiehe
(74) *Attorney, Agent, or Firm* — Ann M. Agosti (57) ABSTRACT

A blade assembly including an outboard blade segment is provided. The outboard blade segment includes an outboard blade shell, first and second outboard bulkheads situated within the outboard blade shell, and an outer box supported by and aligned by the outboard bulkheads. The blade assembly also includes an inboard blade segment including an inboard blade shell, first and second inboard bulkheads situated within the inboard blade shell, and an inner box supported by and aligned by the inboard bulkheads. Further, the inner and the outer boxes are tapered to facilitate insertion of the inner box into the outer box and coupling of the inner and outer boxes.

20 Claims, 10 Drawing Sheets

SYSTEM AND METHOD FOR JOINING TURBINE BLADES

BACKGROUND

The invention relates generally to manufacturing of large turbine blades, and, more particularly, to a system and method for joining turbine blade segments.

Recently, there has been emphasis on conserving energy and producing energy from alternative sources such as wind power. Further, a need has arisen for high power wind turbines that employ blades having lengths of at least fifty meters.

It is convenient and economical to manufacture such long blades in sections that can be separately shipped and then joined together at a wind turbine site. There are several commonly used systems and techniques for joining sections of a structure made of metals, composites or other materials. Some of the techniques include using improved dowel pins or spliced structures.

However, the aforementioned techniques, if applied to turbine blades, are expected to result in undesirable levels of complexity, risk, and expense. Accordingly, an improved joint system is needed to address one or more of the foregoing issues.

BRIEF DESCRIPTION

In accordance with an embodiment disclosed herein, a blade assembly including an outboard blade segment is provided. The outboard blade segment includes an outboard blade shell, first and second outboard bulkheads situated within the outboard blade shell, and an outer box supported by, and aligned by the outboard bulkheads, and having first and second outer box ends. The blade assembly also includes an inboard blade segment including an inboard blade shell, inboard bulkheads situated within the inboard blade shell, and an inner box supported by and aligned by the inboard bulkheads. Further, the outer box and the inner box are tapered to facilitate insertion of the inner box into the outer box and coupling of the inner and outer boxes.

In accordance with another embodiment disclosed herein, a wind turbine blade joint assembly including an outboard wind turbine blade segment is provided. The outboard wind turbine blade segment includes an outboard blade shell, first and second outboard bulkheads situated within the outboard blade shell, and an outer box supported by and aligned by the outboard bulkheads. The wind turbine blade assembly also includes an inboard wind turbine blade segment including an inboard blade shell, inboard bulkheads situated within the inboard blade shell, and an inner box supported by and aligned by the inboard bulkheads. Further, the inner and the outer boxes are tapered to facilitate insertion of the inner box into the outer box and coupling of the inner and the outer boxes.

In accordance with another embodiment disclosed herein, a method of blade manufacture is provided. The method includes obtaining an outboard blade segment including an outboard blade shell, outboard bulkheads situated within the outboard blade shell, and an outer box supported by and aligned by the outboard bulkheads. The method also includes obtaining an inboard blade segment including an inboard blade shell, inboard bulkheads situated within the inboard blade shell, and an inner box supported by and aligned by the inboard bulkheads, wherein the inner and outer boxes are tapered to facilitate insertion of the inner box into the outer box and coupling of the inner and outer boxes. The method further includes inserting a portion of the inner box into the second outer box.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include a system and method for joining turbine blades. As used herein, the term "turbine blades" refers to blades used in various applications such as, but not limited to wind turbines and aircraft systems. When implemented as a bonded system, including composites and adhesives, the resulting blade is devoid of metallic fasteners.

Figure 1:
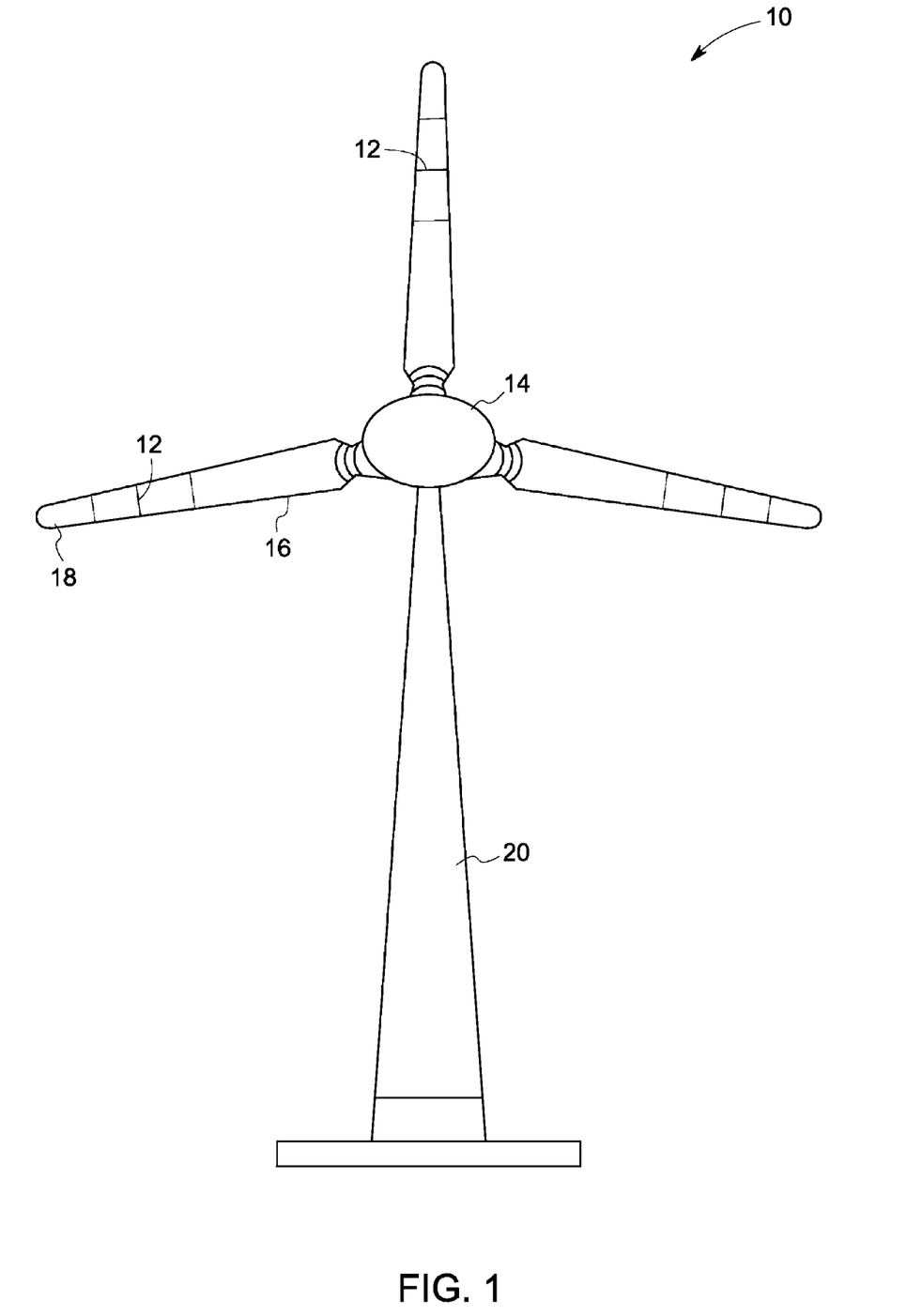
FIG. 1 is a schematic illustration of a wind turbine including a blade assembly in accordance with embodiments disclosed herein.

FIG. 1 is a schematic illustration of a wind turbine system 10 including blade assemblies 12 that each include multiple blade segments 16 and 18. The wind turbine system 10 includes a rotor 14. The blade assemblies are mounted atop a tower 20. In an example, the combined length of the blade segments 16 and 18 is at least fifty meters. In a particular embodiment, the blade assembly joint is located on an outboard half of the blade assembly. In a more specific embodiment, the location is at two-thirds (measured from a hub) of the combined length of the blade segments 16 and 18 as measured from the outer edge of blade assembly 12. In another embodiment, the blade assembly 12 is made of a high strength composite resin that is tolerant to harsh environment conditions such as, but not limited to, inclement weather in a field during assembly.

Figure 2:
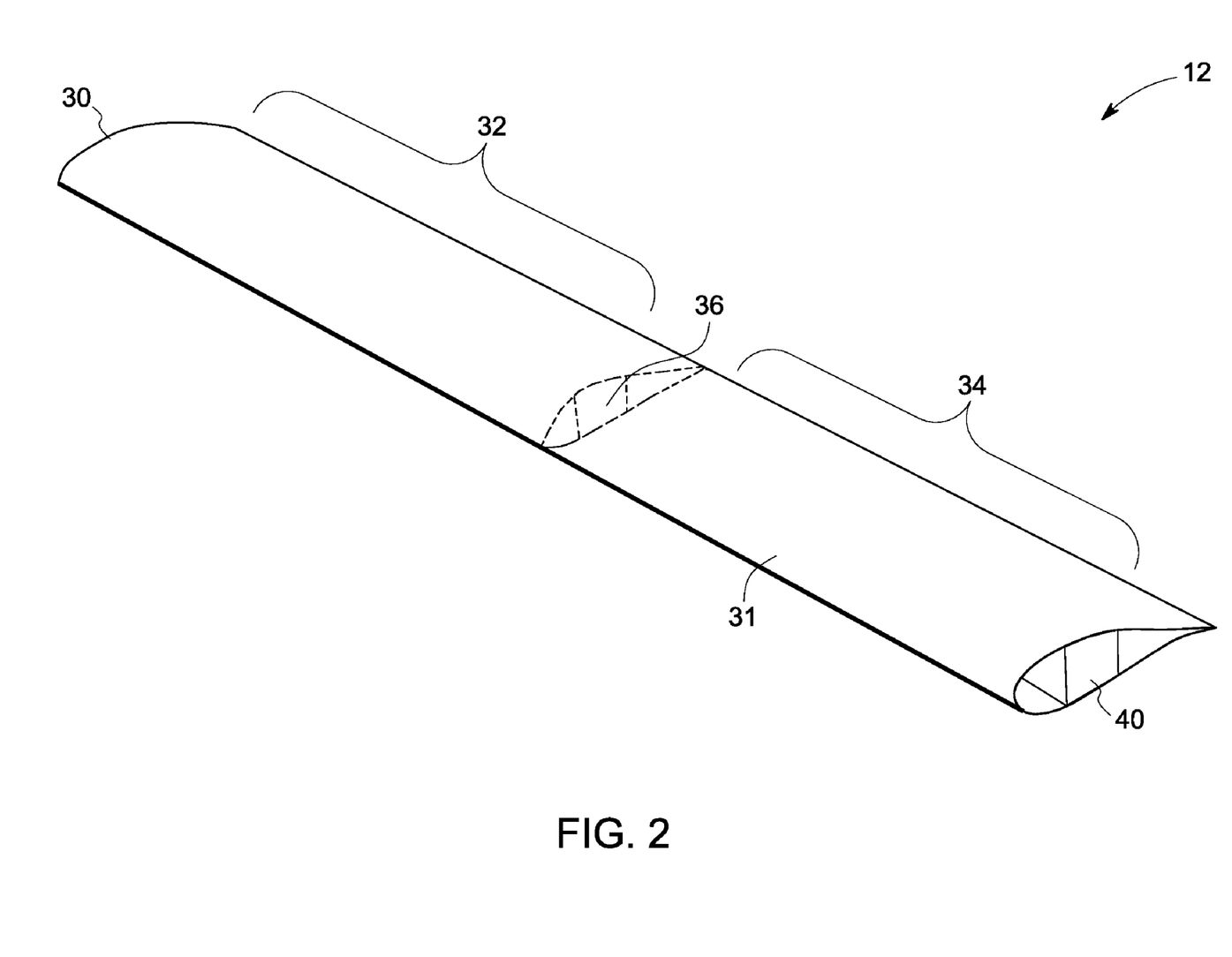
FIG. 2 is a diagrammatic illustration of an exemplary blade assembly in FIG. 1 in accordance with embodiments disclosed herein.
Figure 3:
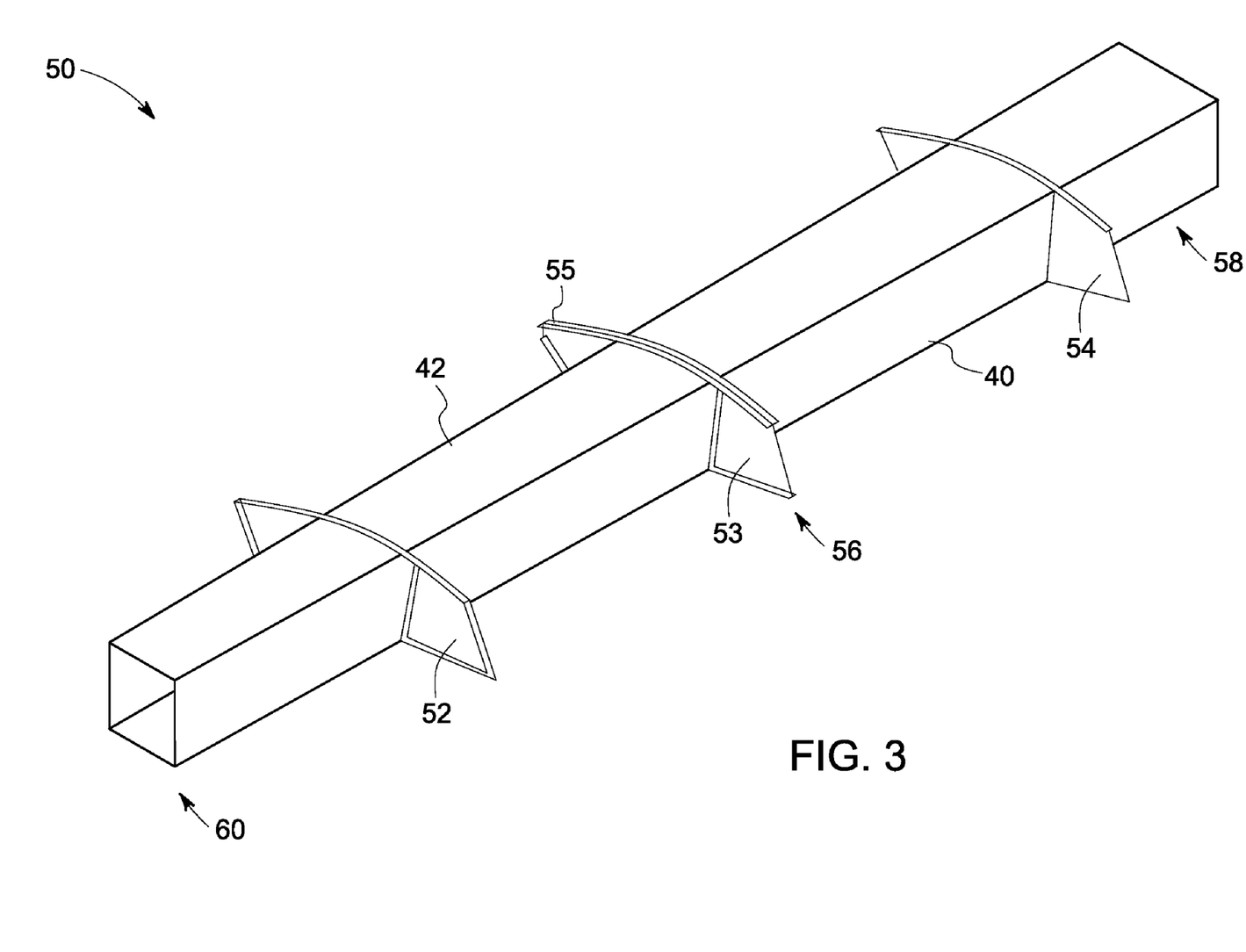
FIG. 3 is a diagrammatic illustration of an assembly of the inner box and inner bulkheads and the outer box and outer bulkheads, both without an airfoil.

FIGS. 2-7 describe various embodiments of blade assembly 12 in greater detail. Specifically, FIG. 2 is a diagrammatic illustration of an exterior view of exemplary blade assembly 12, and FIG. 3 is a diagrammatic illustration of an interior view of blade assembly 12. An outboard blade segment 32 includes an outboard blade shell 30 (or airfoil), first and second outboard bulkheads 52, 53 respectively situated within the outboard blade shell 30, and an outer box 42 supported by and aligned by the outboard bulkheads 52, 53 and having first and second outer box ends, 56 and 60 respectively. As used herein the term "outboard" means farther from the rotor 14 and "inboard" means closer to the rotor 14 (FIG. 1). The blade assembly 12 also includes an inboard blade segment 34 including an inboard blade shell 31, inboard bulkheads 54, 55 situated within the inboard blade shell 31, and an inner box 40 supported by and aligned by first and second inboard bulkheads 54,55 respectively. An inner box end (not visible in FIG. 3) is configured to be insertable into the second outer box end 56 for coupling of the outboard and the inboard blade segments, 32 and 34 respectively. Further, both the inner box 40 and the outer box 42 are tapered to facilitate insertion of the inner box 40 into the outer box 42 and coupling of the inner and outer boxes 40, 42. At least one bulkhead is typically located on the inside of the airfoil 30, 31 at a joint or junction 36 where the outboard blade segment 32 and the inboard blade segment 34 meet.

The outer box 42 and the inner box 40 are adhesively bonded. Further, the inboard bulkheads 54, 55 and the outboard bulkheads 52, 53 enable a tight and precise placement of the inner box 40 and the outer box 42 respectively. In a particular embodiment, one of the inboard bulkheads 54, 55 and one of the outboard bulkheads 53, 52 are located at the inner and the outer box end 56 between the inner box 40 and the outer box 42 and other bulkheads are situated at opposite inner box end 58 and outer box end 60. In a more specific embodiment, the bulkheads 55 and 53 at ends 56 are bonded, such as by use of an adhesive, for example. In the illustrated embodiment, there is a pair of outboard bulkheads and a pair of inboard bulkheads, but additional bulkheads may be used if necessary. During assembly, the two inboard bulkheads 54, 55 and the inner box 40 are inserted into the outboard blade segment 32 of the blade assembly 12. In an example, the inner box 40, the outer box 42, the outboard bulkheads 53, 53 and the inboard bulkheads 54, 55 include carbon.

Figure 4:
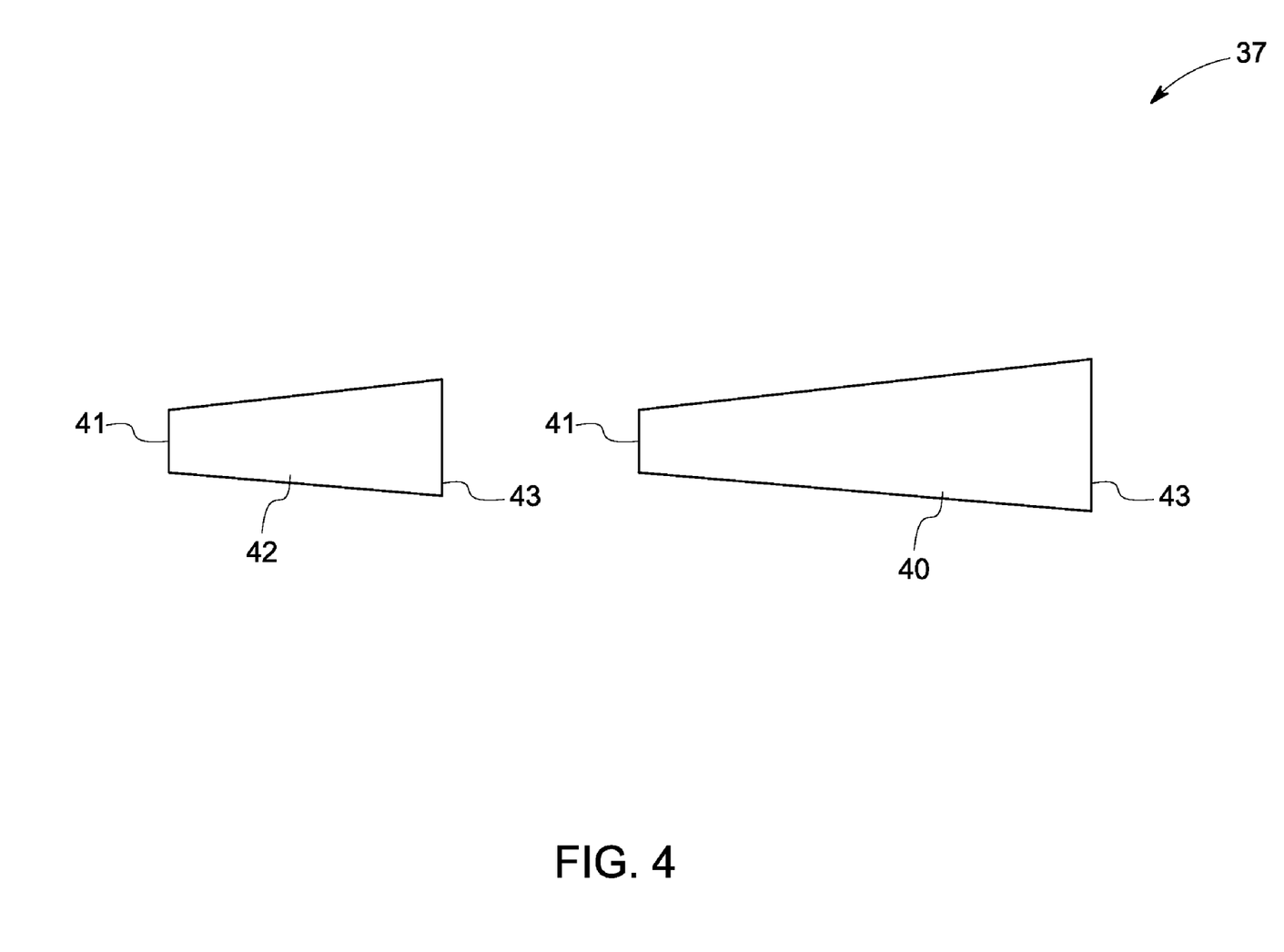
FIG. 4 is a schematic cross-sectional view of an exemplary configuration for an inner box and an outer box in accordance with embodiments disclosed herein.

FIG. 4 is a schematic cross-sectional view of an exemplary configuration 37 for the inner box 40 and the outer box 42. The inner box 40 and the outer box 42 are tapered to provide greater clearance in one region of the outer box end 43 than at an opposite end 41, during a start or an insertion process.

Figure 5:
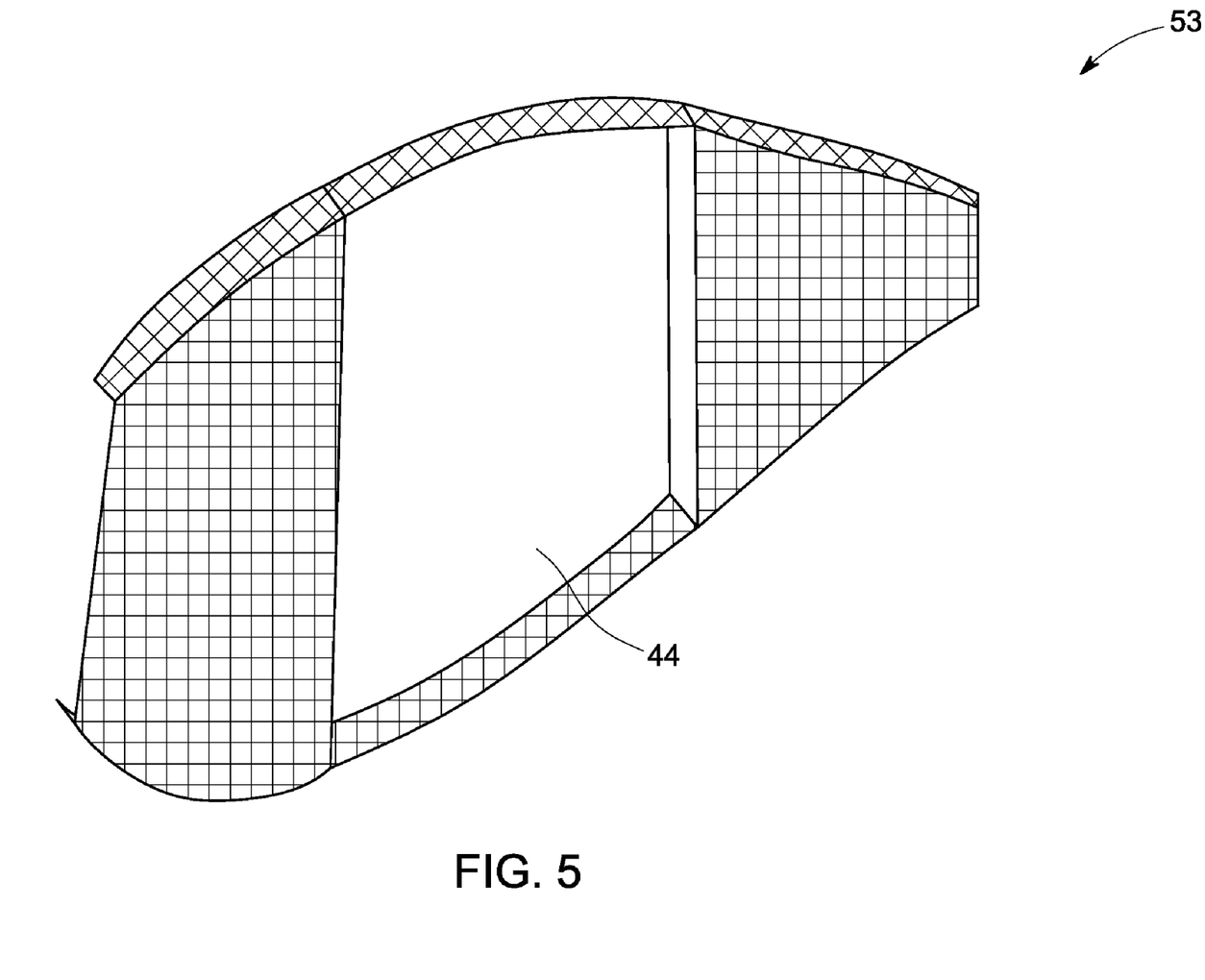
FIG. 5 is a diagrammatic illustration of an exemplary bulkhead.

FIG. 5 is a schematic illustration of an exemplary bulkhead 53 in FIG. 2. The bulkhead includes an opening 44 that allows passage of a box (not shown). In one embodiment minimal clearance between the perimeter of the opening and the box enables precise insertion and infusion of the box into the blade assembly 12. Further, the bulkhead provides a load transmission path for the inner box 40 and the outer box 42 and permits load transfer of torsion, and bending loads.

Figure 6:
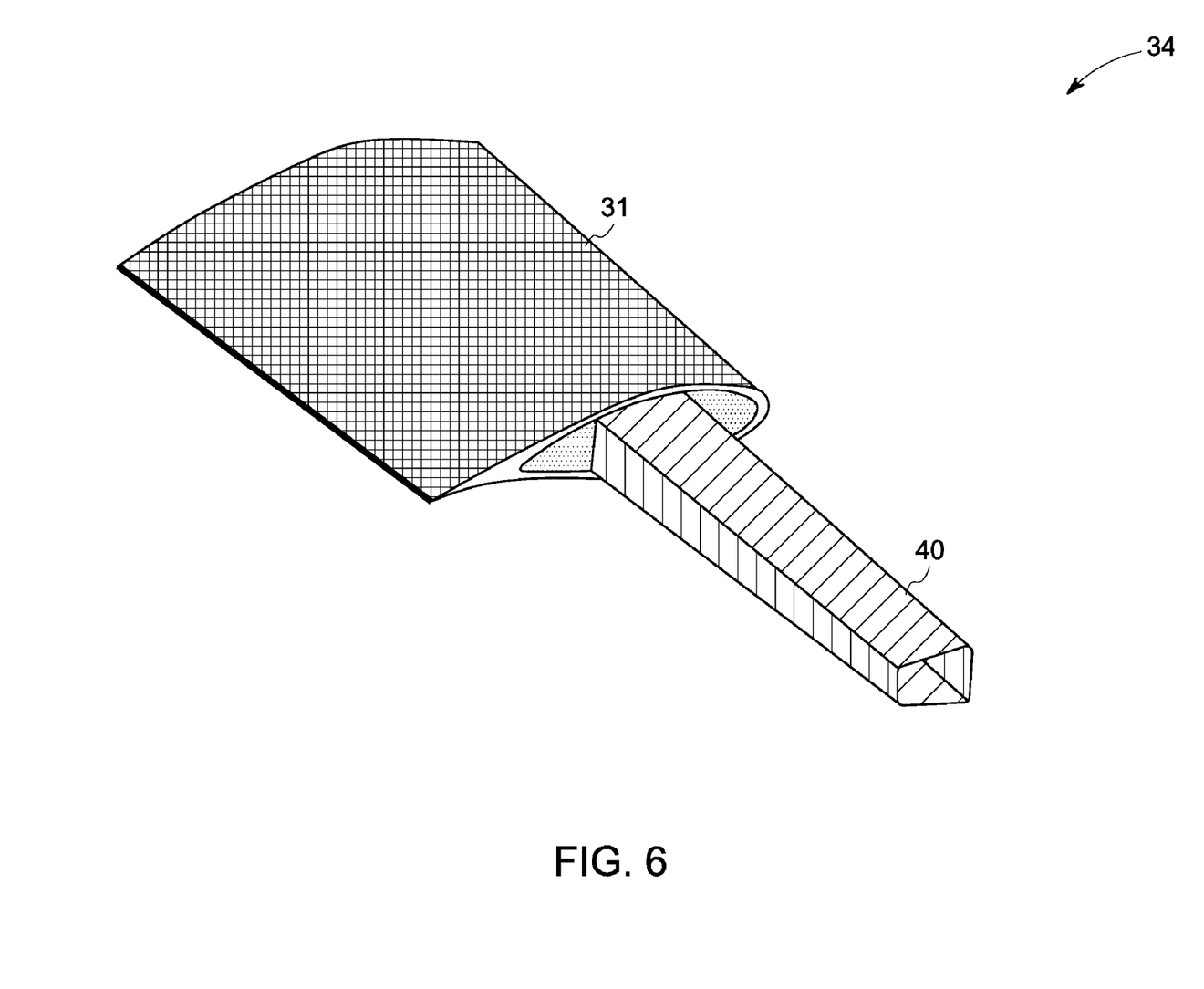
FIG. 6 is a diagrammatic illustration of an inboard section of the blade assembly (FIG. 2), showing the protrusion of the inner box past an end of an inboard blade segment.

FIG. 6 is a diagrammatic illustration of an inboard blade segment 34 (FIG. 2). The inboard blade segment 34 includes the inner box 40 that is inserted into the outer box 42 of the blade assembly 12. An inboard blade shell 31 encloses the inner box 40.

Figure 7:
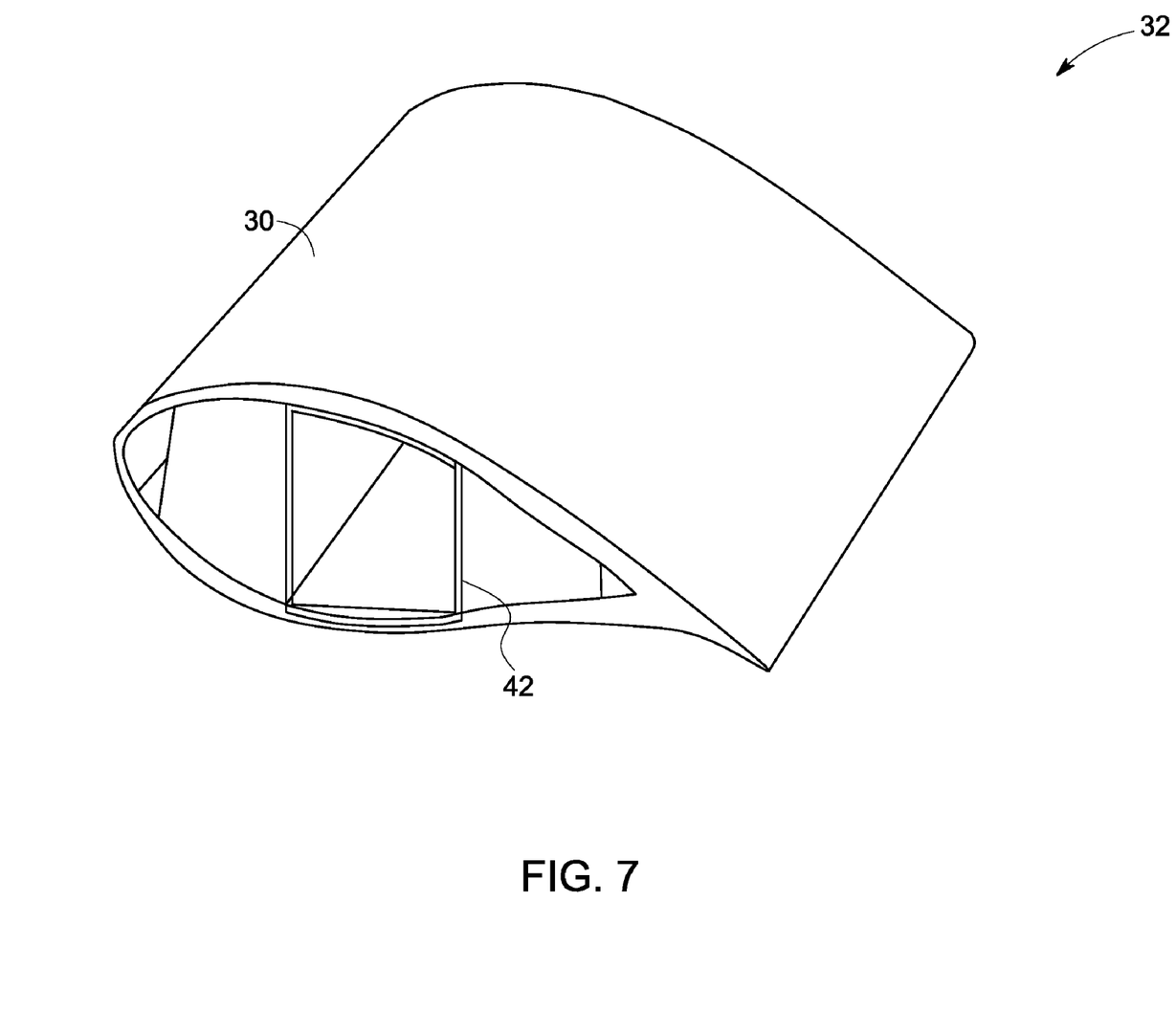
FIG. 7 is a diagrammatic illustration of an outboard section of the blade assembly (FIG. 2), showing the end bulkhead and the beginning of the outer box.

FIG. 7 is a diagrammatic illustration of the outboard blade segment 32 (FIG. 2). The outboard blade segment 32 includes the outer box 42 that is coupled to the inner box 40. An outboard blade shell 30 as referenced in FIG. 2, encloses the outer box 42.

Figure 8:
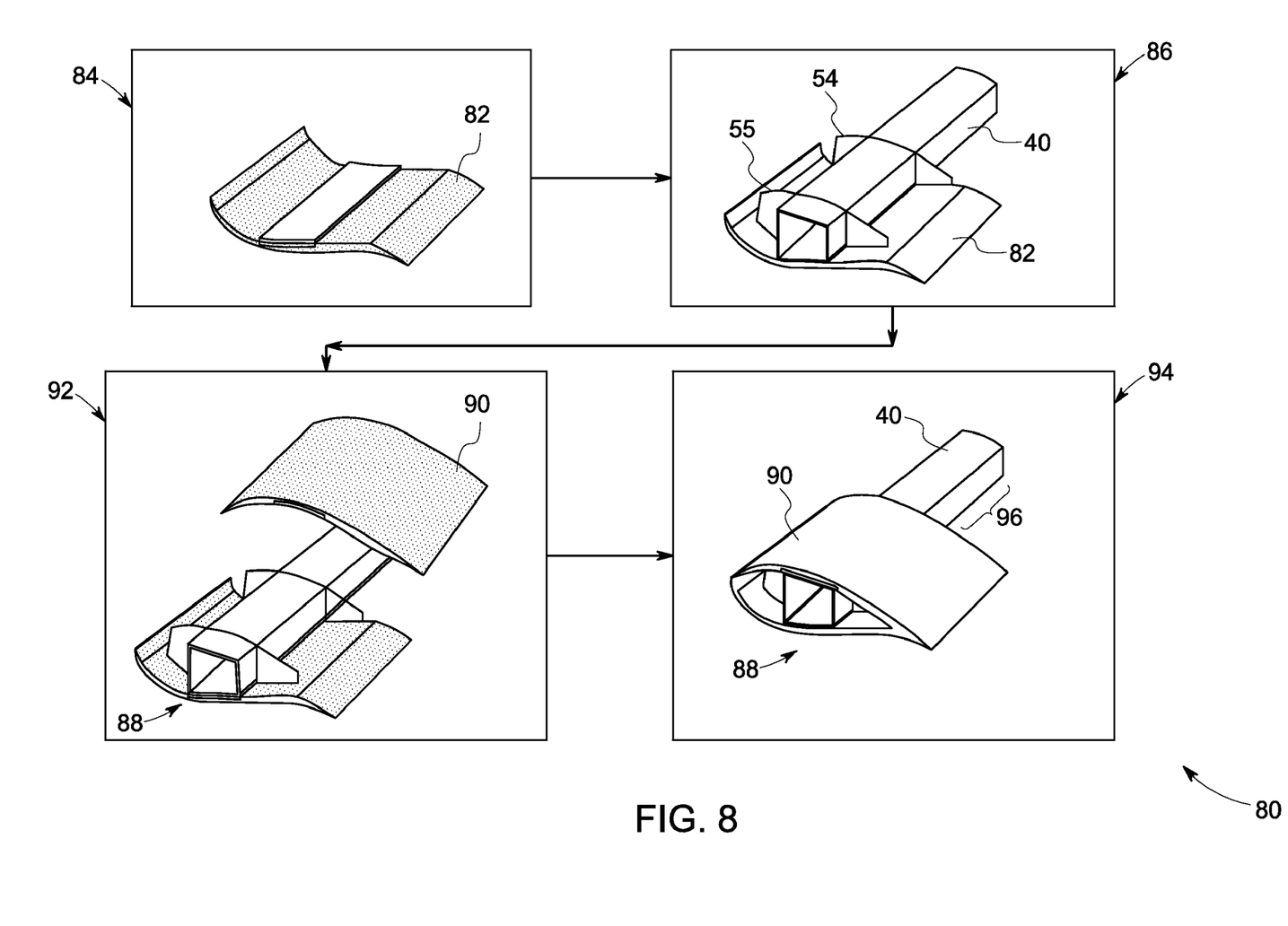
FIG. 8 is a diagrammatic illustration of a process of assembly of an inboard blade segment.

FIG. 8 is a diagrammatic illustration of process 80 for assembling the inboard blade segment 34 as referenced in FIG. 2. Initially, at step 84, a bottom half of an airfoil or an inboard bottom blade shell 82 is molded. In a particular embodiment, the mold includes fiberglass and wood core. At step 86, the inner box 40 and a pair of the inboard bulkheads 54, 55 are pre-cured and infused into the inboard bottom blade shell 82. The infusion takes place before the mold is coated with an adhesive to hold the inboard bulkheads 54, 55 in place. In a non-limiting example, the adhesive includes epoxy, an infusion resin, or combinations thereof. The inboard bulkheads 54, 55 control orientation of the inner box 40. In embodiments wherein the inner box is inserted into the inboard bulkheads prior to the bulkheads being positioned on the inboard bottom blade shell 82, the inboard bulkheads also provide stability in placing the inner box 40 into the inboard bottom blade shell 82. A composite structure 88 including the inboard bottom blade shell 82, the inner box 40, and the inboard bulkheads 54, 55 is formed after infusion.

In step 92, an adhesive is applied to an upper half of the airfoil or an inboard upper blade shell 90, and to the inboard bottom blade shell 82, or to both. In a non-limiting example, the adhesive includes epoxy, an infusion resin, or combinations thereof. Step 94 represents an assembled inboard blade assembly 80. The inboard upper blade shell 90 is bonded to the composite structure 88. The inner box 40 extends a certain length 96 from the upper and lower blade shells 90, 82.

Figure 9:
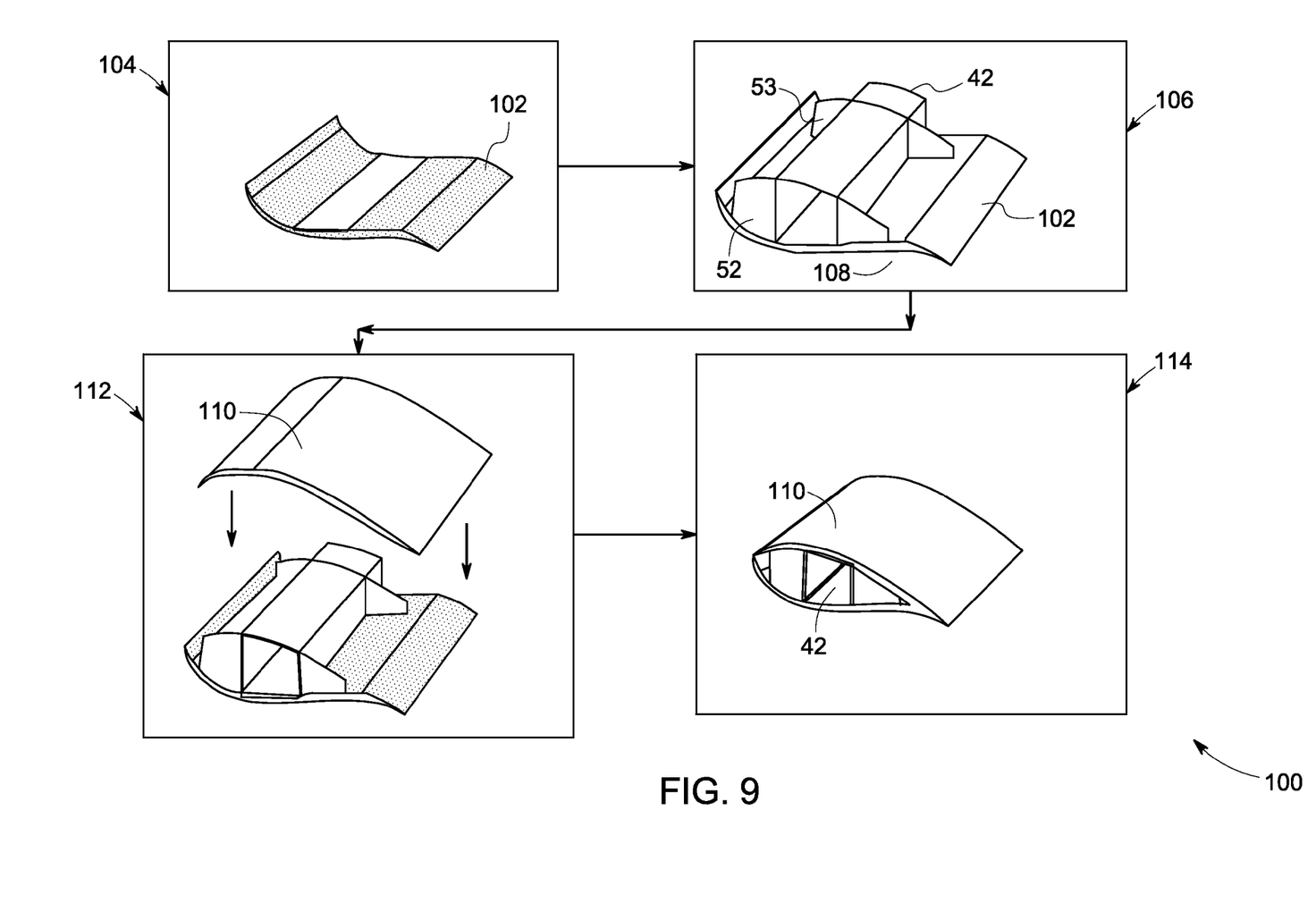
FIG. 9 is a diagrammatic illustration of a process of assembly of an outboard blade segment.

FIG. 9 is a diagrammatic illustration of process 100 for assembling the outboard blade segment 32 as referenced in FIG. 2. Initially, at step 104, a bottom half of an airfoil or an outboard bottom blade shell 102 is molded. In a particular embodiment, the mold includes fiberglass and wood core. At step 106, the outer box 42 and a pair of the outboard bulkheads 52, 53 are pre-cured and infused into the outboard bottom blade shell 102. The infusion takes place before the mold is coated with an adhesive to hold the outboard bulkheads 52, 53 in place. In a non-limiting example, the adhesive includes epoxy, an infusion resin, or combinations thereof. The second bulkheads 52 control orientation of the outer box 46. In embodiments wherein the outer box 42 is inserted into the outboard bulkheads prior to the bulkheads being positioned on outboard bottom blade shell 102, the outboard bulkheads 52, 53 also provide stability in placing the outer box 42 into the outboard bottom blade shell 102. A composite structure 108 including the outboard bottom blade shell 102, the outer box 46 and the outboard bulkheads 52, 53 is formed after infusion.

In step 112, an adhesive is applied to an upper half of the airfoil or an outboard upper blade shell 110. In a non-limiting example, the adhesive includes epoxy, an infusion resin, or combinations thereof. Step 114 represents an assembled outboard blade assembly 100. The upper blade shell 110 is bonded to the composite structure 108.

Figure 10:
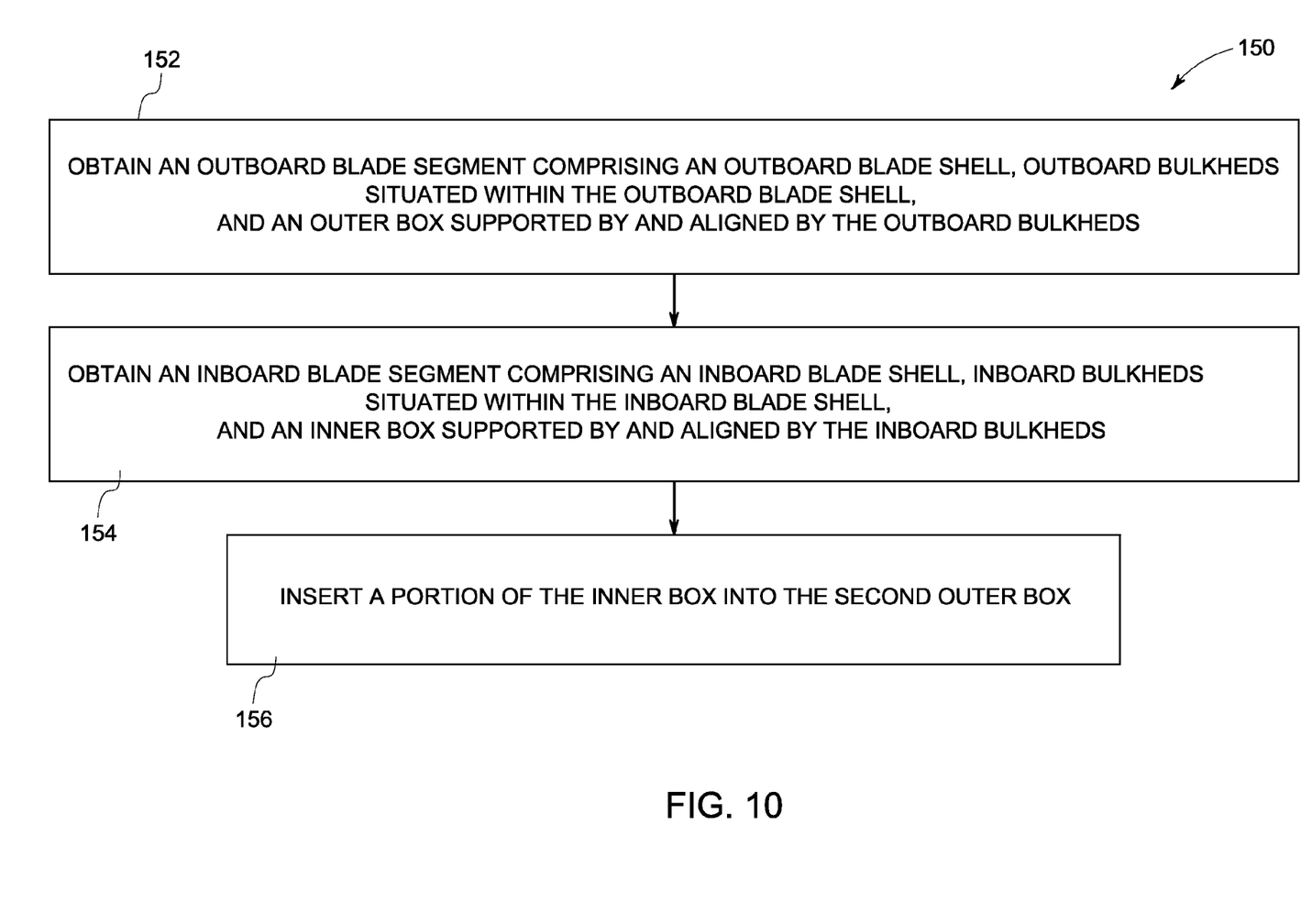
FIG. 10 is a flow chart representing steps involved in an exemplary method of blade manufacture in accordance with embodiments disclosed herein.

FIG. 10 is a flow chart representing exemplary steps involved in a method 150 of blade manufacture. The method 150 includes obtaining an outboard blade segment 32 (FIG. 2) in step 152. The outboard blade segment includes an outboard blade shell 30 (FIG. 2), outboard bulkheads 52, 53 (FIG. 3) situated within the outboard blade shell, and an outer box 42 (FIG. 3) supported by and aligned by the outboard bulkheads (FIG. 3). An inboard blade segment 34 (FIG. 2) is obtained in step 154. The inboard blade segment includes an inboard blade shell 31 (FIG. 2), inboard bulkheads 54, 55 (FIG. 3) situated within the inboard blade shell, and an inner box (FIG. 3) supported by and aligned by the inboard bulkheads. Further, the outer box and the inner box are tapered to facilitate insertion of the inner box into the outer box and coupling of the inner and outer boxes.

In a particular embodiment for steps 152 and 154, obtaining the outboard blade segment 114 (FIG. 9) and the inboard blade segment 94 (FIG. 8) and aligning them for easy insertion of the inboard protruding box into the receiving outboard box . . . .

A portion of the inner box is inserted into the second outer box in step 156. In one embodiment, the portion of the inner box is inserted prior to situating the outer box on the outboard bottom blade shell and situating the inner box on the inboard bottom blade shell. In an exemplary embodiment, the inner box is inserted into the outer box prior to transporting. In another embodiment, the outboard blade segment and the inboard blade segment are separated prior to transporting. In a particular embodiment, the outboard blade segment and the inboard blade segment are transported to a remote location or more specifically to the wind farm. In another embodiment, during final assembly, an adhesive is applied to the inner box, the outer box, or both the inner and the outer boxes. As discussed above, the adhesive may comprise epoxy, an infusion resin, or combinations thereof, for example.

The various embodiments of a system and a method for joining turbine blades described above thus provide an efficient way to join sections of turbine blades. These techniques and systems also allow for highly compact and convenient turbine blade assemblies.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A blade assembly comprising:
   an outboard blade segment comprising an outboard blade shell, first and second outboard bulkheads situated within the outboard blade shell, and an outer box supported by and aligned by the first and second outboard bulkheads;
   an inboard blade segment comprising an inboard blade shell, first and second inboard bulkheads situated within the inboard blade shell, and an inner box supported by and aligned by the first and second inboard bulkheads,
   wherein the inner and outer boxes are tapered to facilitate insertion of the inner box into the outer box and coupling of the inner and outer boxes.

2. The blade assembly of claim 1, wherein the inner box and the outer box are adhesively coupled.

3. The blade assembly of claim 2, wherein the adhesive comprises an epoxy, an infusion resin, or combinations thereof.

4. The blade assembly of claim 1, wherein the first outboard bulkhead and the first inboard bulkhead is adhesively coupled to the second outboard bulkhead and the second inboard bulkhead respectively.

5. The blade assembly of claim 1, wherein the inner box, the outer box, the first outboard bulkheads, the first inboard bulkheads, the second outboard bulkheads and the second inboard bulkheads comprise carbon fiber or fiberglass.

6. A wind turbine blade joint assembly comprising:
   an outboard wind turbine blade segment comprising an outboard blade shell, first and second outboard bulkheads situated within the outboard blade shell, and an outer box supported by and aligned by the first and second outboard bulkheads;
   an inboard wind turbine blade segment comprising an inboard blade shell, first and second inboard bulkheads situated within the inboard blade shell, and an inner box supported by and aligned by the first and second inboard bulkheads,
   wherein the inner and the outer boxes are tapered to facilitate insertion of the inner box into the outer box and coupling of the inner and the outer boxes.

7. The wind turbine blade assembly of claim 6, wherein the inner box and the outer box are adhesively coupled.

8. The wind turbine blade assembly of claim 7, wherein the adhesive comprises an epoxy, an infusion resin, or combinations thereof.

9. The wind turbine blade assembly of claim 6, wherein the first outboard bulkhead and the first inboard bulkhead is adhesively coupled to the second outboard bulkhead and the second inboard bulkhead respectively.

10. The wind turbine assembly of claim 6, wherein the inner box, the outer box, the first outboard bulkheads, the first inboard bulkheads, the second outboard bulkheads and the second inboard bulkheads comprise carbon fiber or fiberglass.

11. The wind turbine blade assembly of claim 6, wherein the inner box is configured to extend into the outer box at a length ranging from two meters to three meters.

12. A method of blade manufacture comprising:
    obtaining an outboard blade segment comprising an outboard blade shell, first and second outboard bulkheads situated within the outboard blade shell, and an outer box supported by and aligned by the first and second outboard bulkheads;
    obtaining an inboard blade segment comprising an inboard blade shell, first and second inboard bulkheads situated within the inboard blade shell, and an inner box supported by and aligned by the first and second inboard bulkheads,
    wherein the inner and outer boxes are tapered to facilitate insertion of the inner box into the outer box and coupling of the inner and outer boxes; and
    inserting a portion of the inner box into the second outer box.

13. The method of claim 12 further comprising:
    transporting the outboard and the inboard blade segments to a remote location; and
    applying adhesive to the inner box, the outer box, or both the inner and outer boxes.

14. The method of claim 13 wherein inserting occurs prior to transporting and further comprising separating the outboard and the inboard blade segments prior to transporting.

15. The method of claim 12 wherein obtaining the outboard and the inboard blade segments further comprises:
    laying up an outboard bottom blade shell and an inboard bottom blade shell;
    situating the first and second outboard bulkheads and the outer box on the outboard bottom blade shell, and situating the first and second inboard bulkheads and the inner box on the inboard bottom blade shell;

infusing the outboard and the inboard bottom blade shells and the outboard bulkheads and the inboard bulkheads; and bonding an outboard upper blade shell to the outboard bottom blade shell and an inboard upper blade shell to the inboard bottom blade shell.

16. The method of claim 15, wherein the inserting a portion of the inner box into the outer box occurs prior to situating the outer box on the outboard bottom blade shell and situating the inner box on the inboard bottom blade shell.

17. The method of claim 15, wherein situating the outboard bulkheads comprises situating the outboard bulkheads at a first outer box end and a second outer box end.

18. The method of claim 15, wherein situating the inboard bulkheads comprises situating the inboard bulkheads at a first inner box end and a second inner box end.

19. The method of claim 15, wherein situating the outboard bulkheads and the inboard bulkheads comprises applying an adhesive.

20. The method of claim 19, further comprising rapid curing the adhesive.

* * * * *